Sept. 18, 1956 — H. E. ELLER ET AL — 2,763,278

CONTROLLER

Filed April 20, 1955 — 2 Sheets-Sheet 1

INVENTORS.
HAROLD E. ELLER
ROBERT D. SCHMITT
BY Arthur H. Swanson
ATTORNEY.

Sept. 18, 1956  H. E. ELLER ET AL  2,763,278
CONTROLLER
Filed April 20, 1955  2 Sheets-Sheet 2

INVENTORS.
HAROLD E. ELLER
ROBERT D. SCHMITT
BY
Arthur H. Swanson
ATTORNEY.

United States Patent Office 2,763,278
Patented Sept. 18, 1956

2,763,278

CONTROLLER

Harold E. Eller, El Paso, Tex., and Robert D. Schmitt, Oreland, Pa., assignors to Minneapolis-Honeywell Regulator Company, Minneapolis, Minn., a corporation of Delaware Application April 20, 1955, Serial No. 502,702

7 Claims. (Cl. 137—82)

Air-operated apparatus for operating industrial processes is well known. Such apparatus includes: a final control valve, which governs the supply of fuel or other control agent to the process; a manually operable means for actuating this final control valve; and an automatically operable means for actuating this final control valve. This automatically operable means includes a measuring instrument responsive to the controlled variable of the process and actuates the final control valve automatically in response to the variations in this controlled variable.

It is an object of this invention to provide means for shifting control of the final control element from the manually operable means to the automatically operable means or vice versa without a disturbance or "bump" in the process under control.

More specifically, it is an object of this invention to provide a transmitter-receiver, which may be operated in either one of the two following ways: (1) Manually operated as a transmitter to actuate the final control valve; (2) actuated as a receiver by the pressure then applied to the final control valve. This transmitter-receiver may have an intermediate or "seal" position in which the pressure currently applied to the final control valve and the pressure about to be applied to the final control valve are equalized. This permits the transfer of control of the valve to be made smoothly and without noticeable disturbance to the process under control.

It is a further object of this invention to avoid the limitations of the devices known to the prior art in which transfer of control of a final control valve from a manually operable device to an automatically operable device or vice versa required the operator to observe gauges indicating the pressures applied to the final control valve at that instant and the pressure about to be applied to the final control valve, to note when these pressures were equal or substantially equal, and to then actuate a transfer valve to effect the transfer of control.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 4 is an end view on the same scale as Figs. 2 and 3; and

Fig. 5 is a side elevation of details of the flapper-nozzle valve. This view is broken away longitudinally.

*General description*

Figure 1:
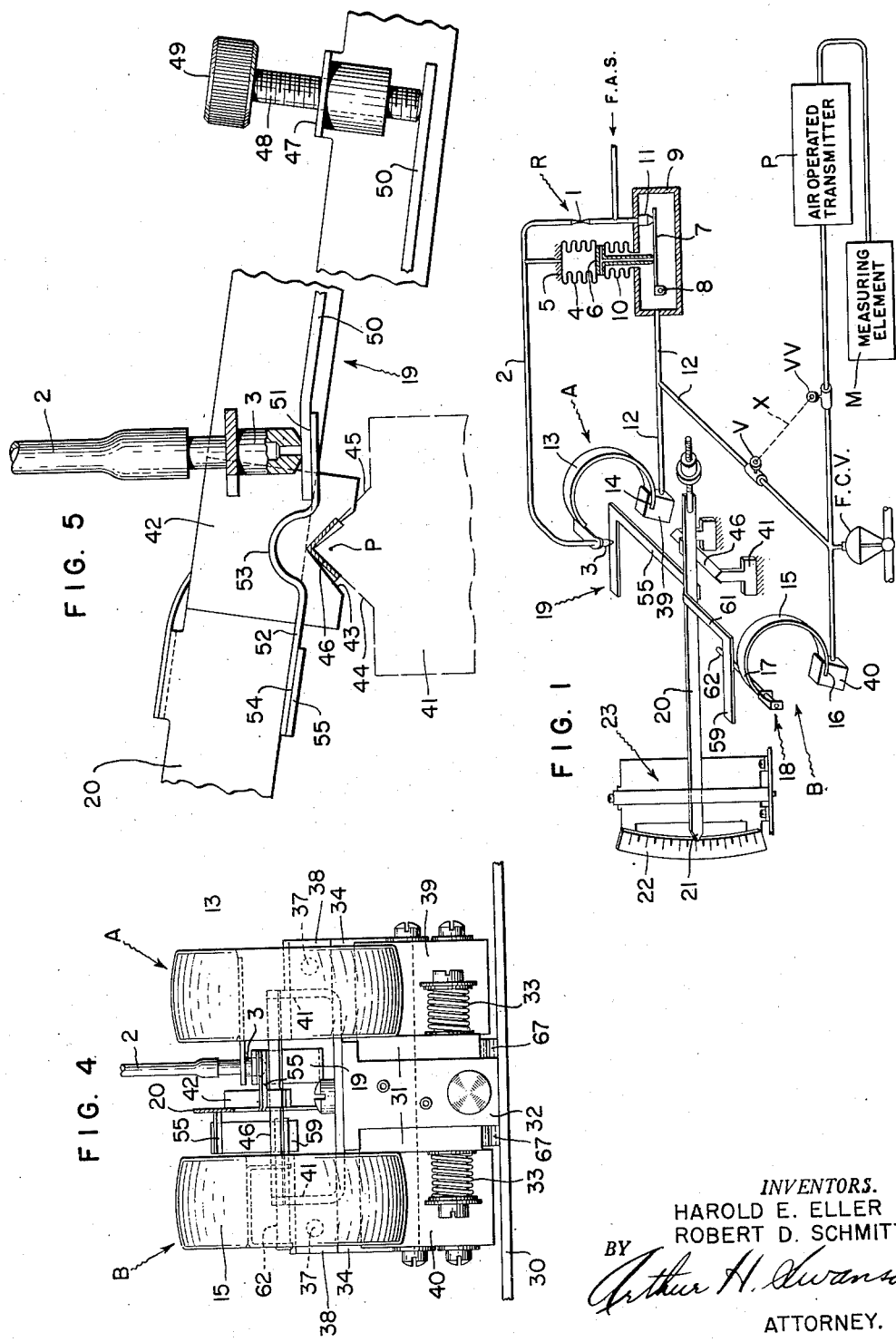
Fig. 1 is a diagrammatic or schematic view.

Fig. 1 shows a measuring instrument or element M. Measuring element M is connected in any one of a variety of ways to an air operated transmitter P. Variations in the controlled variable, to which the measuring element M is responsive, are transmitted by this connection to the transmitter P. The transmitter P converts these variations into changes in the air pressure put out by transmitter P. This output air pressure is fed through a pipe, which may be opened or closed by a valve VV, to a final control valve FCV. Valve VV is interlocked with valve V by an interlock indicated at X so that, when valve VV is opened manually, valve V is closed, and vice versa.

One example of such a measuring element and such an air-operated transmitter is to be found in U. S. Patent 2,311,853; patented February 23, 1943; to C. B. Moore.

Fig. 1 also shows a source of power such as filtered air or other fluid under pressure. This source is marked FAS. Connected to this source is a relay, generally indicated at R, and including a restriction 1 connected by a hollow pipe or flexible tube 2 to a nozzle 3. Pipe 2 also connects to a motor 4 formed by a bellows mounted on a stationary support 5 and carrying at its free end a hollow, T-shaped exhaust valve 6. The stem or vertical arm of this T-shaped exhaust valve bears on a flapper 7 pivotally mounted at 8 and located in a closed chamber 9. A sealing bellows 10 surrounds the stem or vertical arm of the exhaust valve 6. Flapper 7 also bears against a hollow inlet port 11 directly connected to source FAS.

A first air-operated motor, generally indicated at A, is connected by a pipe 12 to the output of the relay R. This first motor A comprises a Bourdon tube 13, which carries the nozzle 3 at its free or movable end and which is mounted on a stationary support 14 at its other end.

A second motor, generally indicated as B, comprises a Bourdon tube 15 having a stationary end 16 and movable end 17 connected by a link 18 to a flapper 19. Flapper 19 is pivotally mounted on a pivotally supported indicator arm 20 which bears, at its free end, a pointed head 21 co-operating with a scale 22. A locking means 23 is provided for locking the indicating arm 20 and consequently the flapper 19 and the free end 17 of the Bourdon tube or second motor B. The operation of this locking means will be explained in greater detail hereinafter. The output of relay R is led by pipe 12 to first motor A and to one side of a manually operable valve V, which is connected, at its opposite side, to second motor B and to the air-operated motor for the final control valve FCV.

When it is desired to use the device as a manually operated transmitter, the locking device 23 is unlocked and valve V is manually opened. Indicator arm 20 may then be rocked by hand about its pivot, thus causing flapper 19 to move relative to nozzle 3 and to vary the air pressure put out by relay R. This air pressure is fed through pipe 12 to first motor A and thereby causes the nozzle 3 to follow the motions of the flapper 19. This output air pressure is also fed through valve V, which is open, to second motor B so that the pressure in motors A and B is the same. Motor B is forced mechanically to assume a position other than the position dictated by the pressure within it. However, valve V permits the pressure within motor B quickly to come to the value dictated by the position of motor B. This is due to the fact that the pressure within motor B quickly equalizes with the pressure within motor A through valve V. When it is desired to stop the motion of the final control valve FCV, which is connected to the second motor B, the locking device 23 is moved so as to lock indicator arm 20 against the edge of scale 22 and thereby hold the indicator arm 20 in the position to which it has been adjusted. This insures that the final control valve FCV remains in the position to which it has been adjusted.

When it is desired to use the device as a receiver the valve V is closed and the locking device 23 is moved so as to free the indicator arm 20 for movement. The second motor B is connected to an air pressure which is automatically controlled so that the instantaneous value of this air pressure represents the instantaneous value of the air pressure which is next to be applied so as to operate the final control valve FCV automatically. Movement of the free end of second motor B causes flapper 19 to move relative to nozzle 3, but since first motor A is supplied with air from the source FAS through relay R, the first motor causes the nozzle 3 to follow the flapper 19 and thereby causes the pressure in first motor A to equal the pressure in second motor B.

Thus it will be seen that, whether the device is operating as a transmitter or as a receiver, the pressure in motor A is equal to the pressure in motor B. Therefore, the final control valve may be shifted from automatically operated control to manually operated control or vice versa without any disturbance to the process being governed by the final control valve FCV.

If desired, the relay R may be omitted. In such case, the pipe 2 is connected directly to the pipe 12. Since, in such case, the pipe 12 would have no other connection to a supply of air, the pressure in the first motor A would be governed by the difference between the supply of air through the restriction 1 and the escape of air through the nozzle 3.

*Detailed description*

Referring now to Figs. 2, 3, 4, and 5, the transmitter-receiver (comprising the air-operated motors A and B) is shown as mounted on a stationary base plate or support 30. Fig. 4 shows a pair of movable guides 31 projecting upward from plate 30. Between these guides is located a stationary body 32 of generally T-shape in transverse cross section. This body is fixed to base plate 30. The movable guides are held in selected, adjusted position to the sides of body 32 by springs 33 which yieldingly stress through the guides 31 against the sides of the body 32. The movable guides are held up against the under side of the horizontal projections of the stationary body 32 by the leaf springs 67 which slide along the base plate 30 when the guides 31 and Bourdon tubes are moved by the span and zero adjusting differential screws 35.

Figures 2, 3:
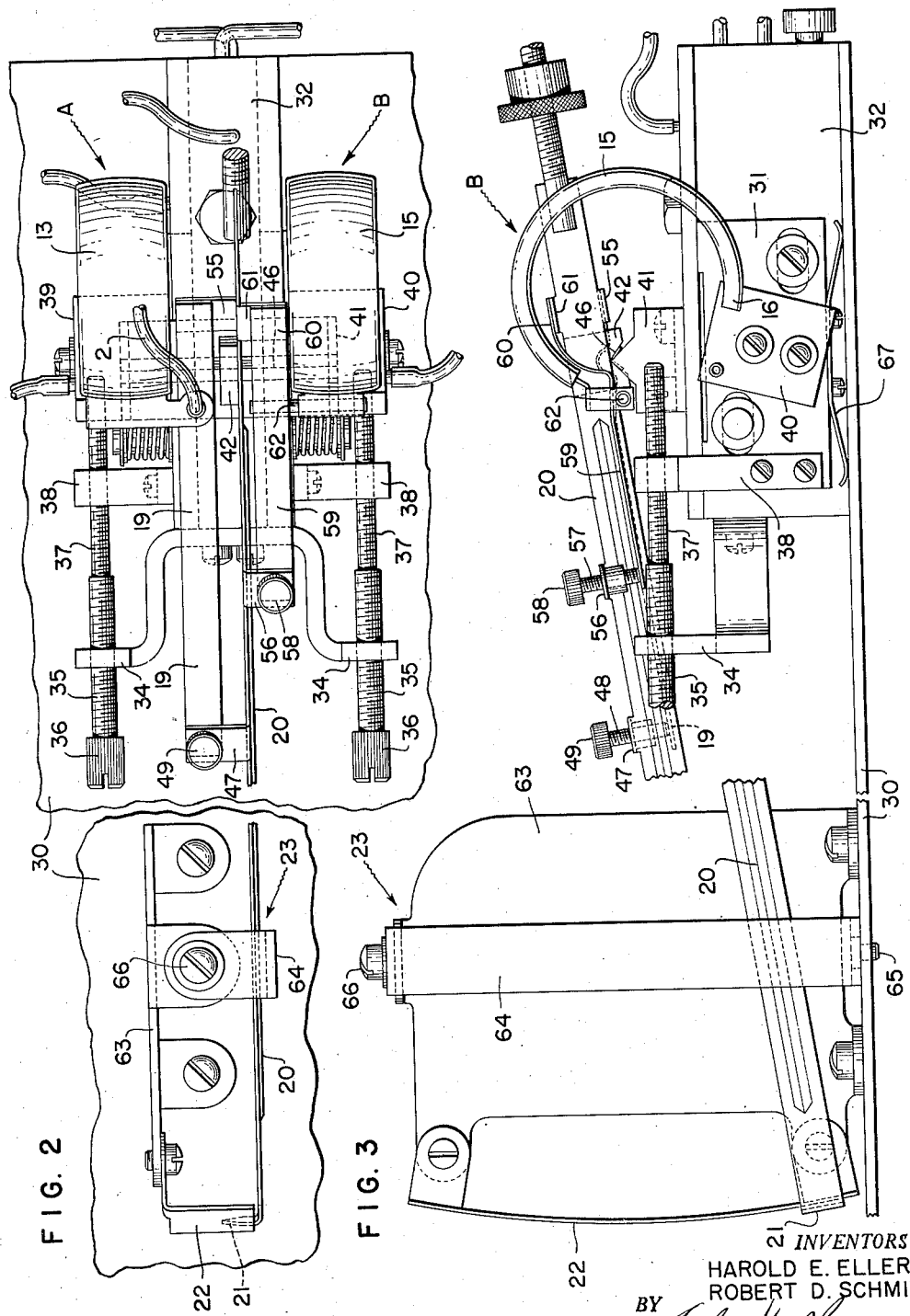
Fig. 2 is a top or plan view broken away longitudinally.
Fig. 3 is a side elevation on the same scale as Fig. 2 and also broken away longitudinally.

Figs. 2 and 3 show that the left end of body 32 has attached to it a yoke 34 in which are screw threadly engaged to the larger portions 35 of a pair of differential screws having knurled, slotted heads 36 and smaller, screw threaded portions 37 which engage with sunpports 38 which are attached to the movable guides 31.

The first motor A has its relatively stationary end 14 (Fig. 1) mounted on a block 39 which is attached to a movable guide 31. Likewise motor B has its stationary end 16 attached to a normally stationary block 40 carried by guide 31. Guide 31 is biased upward by springs 67.

The body 32 carries on its top a U-shaped bracket 41 which forms part of a pivot or support for the indicator arm 20 and for the flapper 19 carried by indicator arm 20. Fig. 5 shows that indicator arm 20 has attached to it a block or relatively rigid member 42 provided with a notch 43 in it. The upper end surfaces 44 and 45 of bracket 41 meet at substantially a right angle. To these surfaces is soldered or otherwise suitably secured the ends of the inner or confronting faces of an angle bar 46 which extends across the open portion of the bracket 41 so as to provide a pivot. Notch 43 in member 42 is likewise approximately a right angle. A portion of the angle bar 46, intermediate the ends thereof, is soldered or otherwise suitably secured to the notch 43 of the member 42. Thus the indicator arm 20 is mounted on the angle bar 46 intermediate the ends of the angle bar 46 which ends are suported by and secured to the upwardly projecting portions of the bracket 41. The angle bar 46 can thus pivot or twist about an axis coincident with or adjacent to the line at which the divergent walls of the angle bar 46 meet. This axis of rotation of indicator arm 20 is indicated in Fig. 5 by point P. This type of pivot is known as a torsion angle pivot. Such a pivot is shown in application S. N. 433,669, Robert J. Wagner, filed June 1, 1954.

Fig. 5 further indicates that arm 20 has an ear 47 struck up from it. Through ear 47 extends a screw 48 having a knurled head 49 which bears at its opposite end against a relatively rigid bar 50 which is secured at interface 51 by solder or other suitable means to a relatively flexible bar 52 having a bent or semi-circular portion 53, which gives it greater flexibility. Relatively flexible portion 52 is secured at interface 54 by solder or other suitable means to a second ear 55 also struck up from indicator arm 20. Elements 50—55 comprise the flapper, generally indicated in Fig. 1 at 19, which cooperates with the nozzle 3, which is shown in detail in Fig. 5.

Fig. 2, and especially Fig. 3, show that indicator arm 20 has a third ear 56 struck up from it. A screw 57 having a knurled head 58 extends through ear 56 and bears at its opposite end against a leaf spring 59 which is connected at its opposite or right end 60 to a fourth ear 61 struck up from indicator arm 20. The free end of motor B carries on it a pin 62 which bears against the under side of leaf spring 59. Elements 56—62 form the link or connection generally indicated in Fig. 1 at 18 and forming means for transmitting the motion of the free end of the second motor B to the indicator arm 20. Nozzle 3 is connected to restriction 1 and to motor 4 by a flexible tube 2.

Figs. 2 and 3 show, in greater detail, the locking means generally indicated in Fig. 1 at 23. Locking means 23 comprise a stationary plate or support 63 which is secured to support 30 and carries on it a U-shaped bracket 64 by means of a pivot pin 65 and a screw 66, which may be loosened so as to permit indicator arm 20 to move freely between the edge of scale 22 and the left edge of bracket 64. When it is desired to lock indicator arm 20 in position, bracket 64 is rotated about pivot 65 so that the left edge of bracket 64 clamps indicator arm 20 against the confronting edge of scale 22. Screw 66 is then tightened so as to hold bracket 64 in its locking position.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is as follows:

1. An air-operated transmitter and receiver including, a restriction adapted for connection to a supply of air under pressure, a first air-operated motor connected to said restriction and having a part movable in response to variations in the pressure applied to said first motor, a second air-operated motor having a part movable in the same sense as the movable part of said first motor in response to variations in the pressure applied to said second motor and having an outlet adapted to transmit or to receive a variable air pressure, a control valve having a first portion movable with the movable part of said first motor and a second portion movable with the movable part of said second motor, the cooperation of said first and second portions of said control valve controlling the pressure operative within said first motor, and a switch valve connected at one side to said first motor and to said restriction and connected at the other side to said second motor and operable to open or close communication therebetween.

2. A transmitter and receiver according to claim 1 having an indicator movable with the movable part of said second motor.

3. An air-operated device adapted to be manually operated so as to transmit a signal to a remote location or to be automatically operated so as to receive a signal from said remote location and adapted to be switched from transmitting position to receiving position without disturbance, said device including, a restriction adapted for connection to a supply of air under pressure, a first Bourdon tube having one end fixed and connected to the opposite side of said restriction from said supply and having the other end movable, a second Bourdon tube having one end fixed and connected to an outlet adapted to transmit or to receive a variable air pressure and having the other end movable, a nozzle mounted on the movable end of said first Bourdon tube and communicating with the interior thereof, a flapper connected so as to be actuated by the movable end of said second Bourdon tube and cooperating with said nozzle so as to vary the pressure operative within said first Bourdon tube, the movable ends of said Bourdon tubes moving in the same direction upon a change in the pressure within said Bourdon tubes in the same sense, a switch valve connected at one side to said restriction and to the fixed end of said first Bourdon tube and connected at the other side to the fixed end of said second Bourdon tube and to said outlet and operable to open or close communication therebetween, an indicator connected so as to be actuated by the movable end of said second Bourdon tube, and a scale with which said indicator cooperates.

4. An air-pressure-operated device manually actuated as a transmitter and automatically actuated as a receiver, including, a first motor movable in one direction upon a change in one sense of the pressure of the air impressed thereon, a second motor movable in the same direction upon a change in the same sense of the pressure of the air impressed thereon, a valve operated upon relative movement between said first and second motors so as to change the pressure of the air impressed on said first motor in such a sense as to cause said first motor to follow said second motor, and a second valve manually operable to connect said first and second motors when said device is being actuated as a transmitter and to disconnect said first and second motors when said device is being actuated as a receiver.

5. An air-operated transmitter and receiver including, a restriction adapted for connection to a supply of air under pressure, a first air-operated motor connected to said restriction and having a movable part, a nozzle mounted on said movable part and connected to the pressure operative within said first motor, a second air-operated motor having a part movable in the same direction as the movable part of said first motor upon a change in the pressure operative in said first and second motors in the same sense, the movable part of said second motor acting as a flapper in cooperation with said nozzle so as to vary the pressure operative in said first motor in the same sense as the pressure varies in said second motor or vice versa, and a switch valve connected at one side to said first motor and to said restriction and connected at the other side to said second motor and to an outlet adapted to transmit or to receive a variable air pressure, said switch valve being operable to open or close communication therebetween.

6. An air-pressure-operated device manually actuated as a transmitter and automatically actuated as a receiver, including, a first motor movable in one direction upon a change in one sense of the pressure of the air impressed thereon, a second motor movable in the same direction upon a change in the same sense of the pressure of the air impressed thereon, a valve operated upon relative movement between said first and second motors so as to change the pressure of the air impressed on said first motor in such a sense as to cause said first motor to follow said second motor, a second valve manually operable to connect said first and second motors when said device is being actuated as a transmitter and to disconnect said first and second motors when said device is being actuated as a receiver, and means manually operable into and out of engagement with said second motor and adapted to retard movement of said second motor when in engagement therewith.

7. An air-pressure-operated device manually actuated as a transmitter and automatically actuated as a receiver, including, a first motor movable in one direction upon a change in one sense of the pressure of the air impressed thereon, a second motor movable in the same direction upon a change in the same sense of the pressure of the air impressed thereon, a valve operated upon relative movement between said first and second motors so as to change the pressure of the air impressed on said first motor in such a sense as to cause said first motor to follow said second motor, a second valve manually operable to connect said first and second motors when said device is being actuated as a transmitter and to disconnect said first and second motors when said device is being actuated as a receiver, a stationary part adjacent a movable part of said second motor, and a bracket manually operable into and out of engagement with the movable part of said second motor thereby causing the movable part of said second motor to engage said stationary part, the movement of said second motor being retarded when said parts are in engagement.

No references cited.